No. 862,425. PATENTED AUG. 6, 1907.
F. H. DE VEULLE.
SPEED GEAR.
APPLICATION FILED NOV. 26, 1906.
3 SHEETS—SHEET 3.
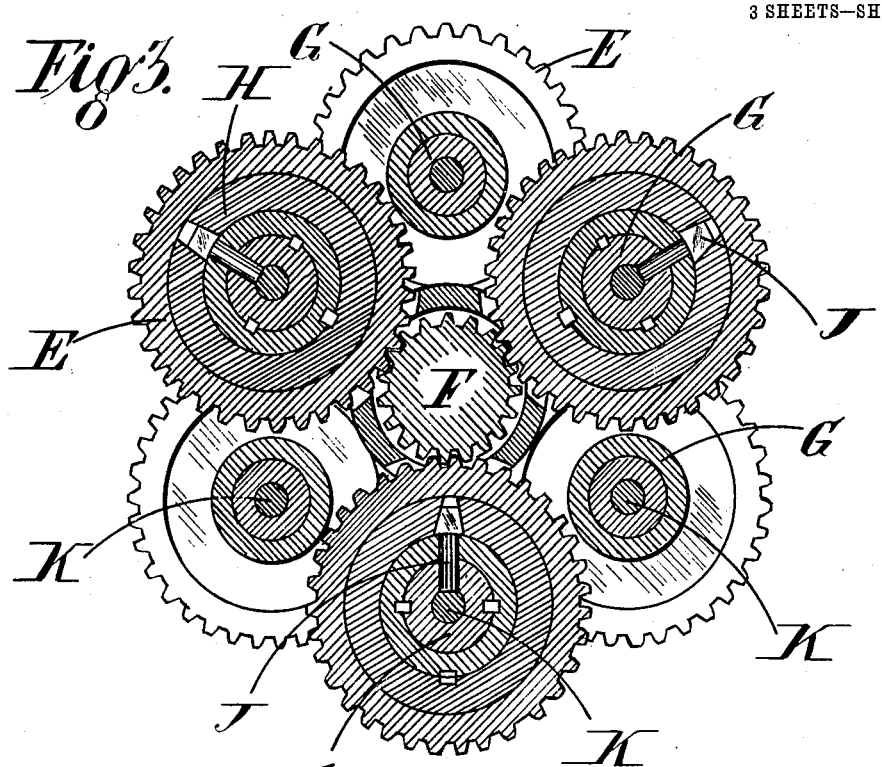
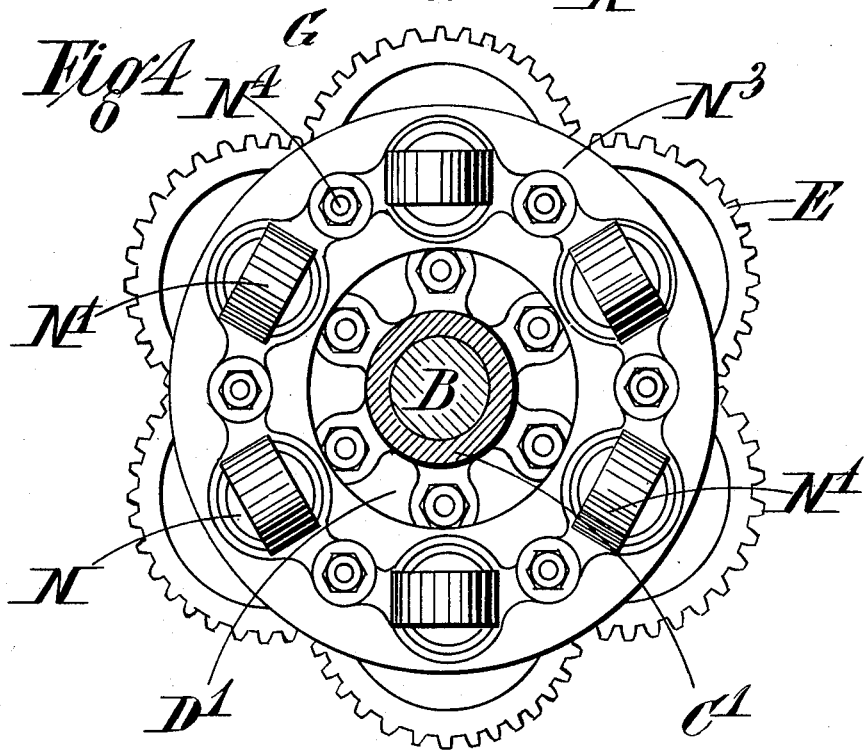

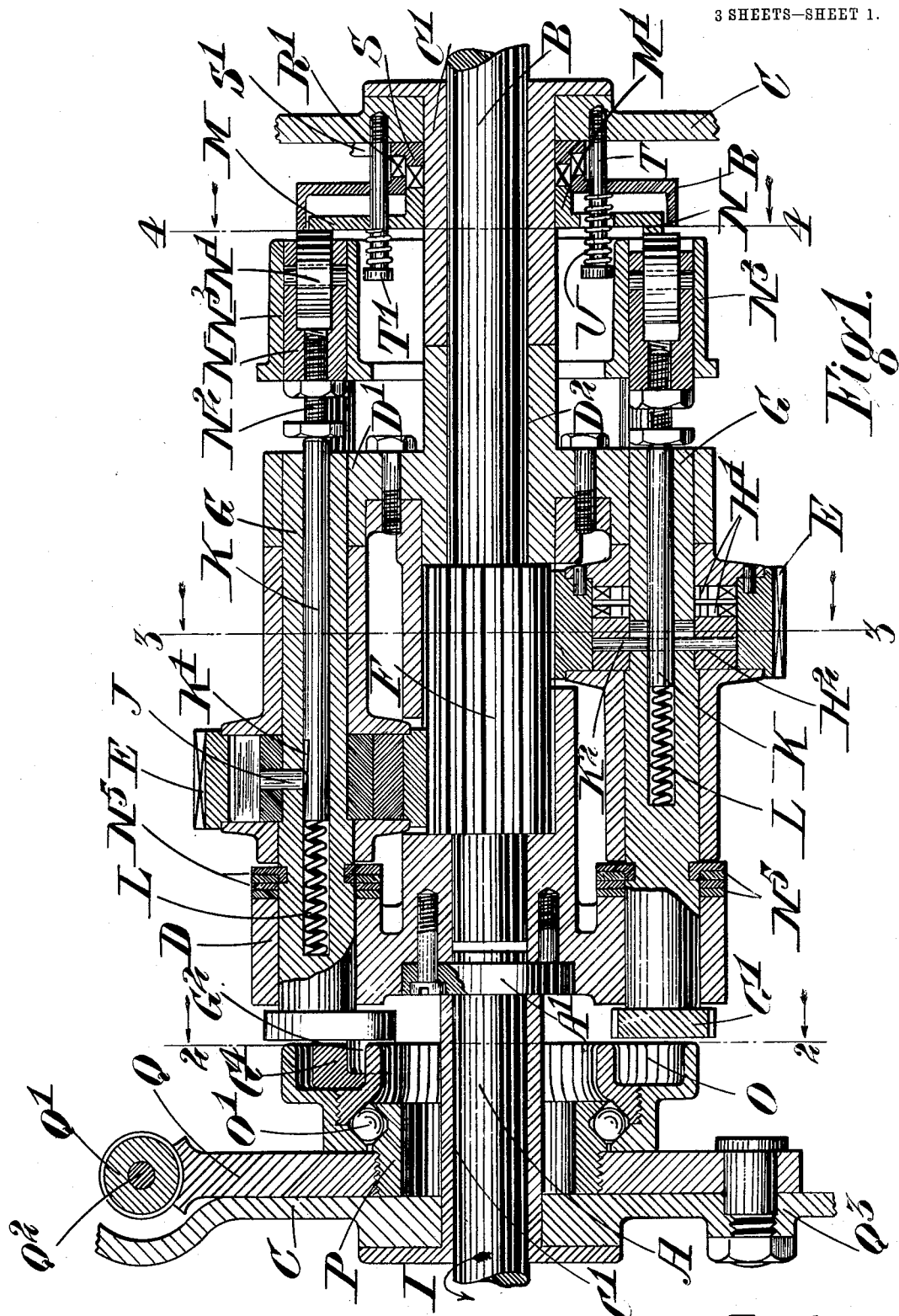

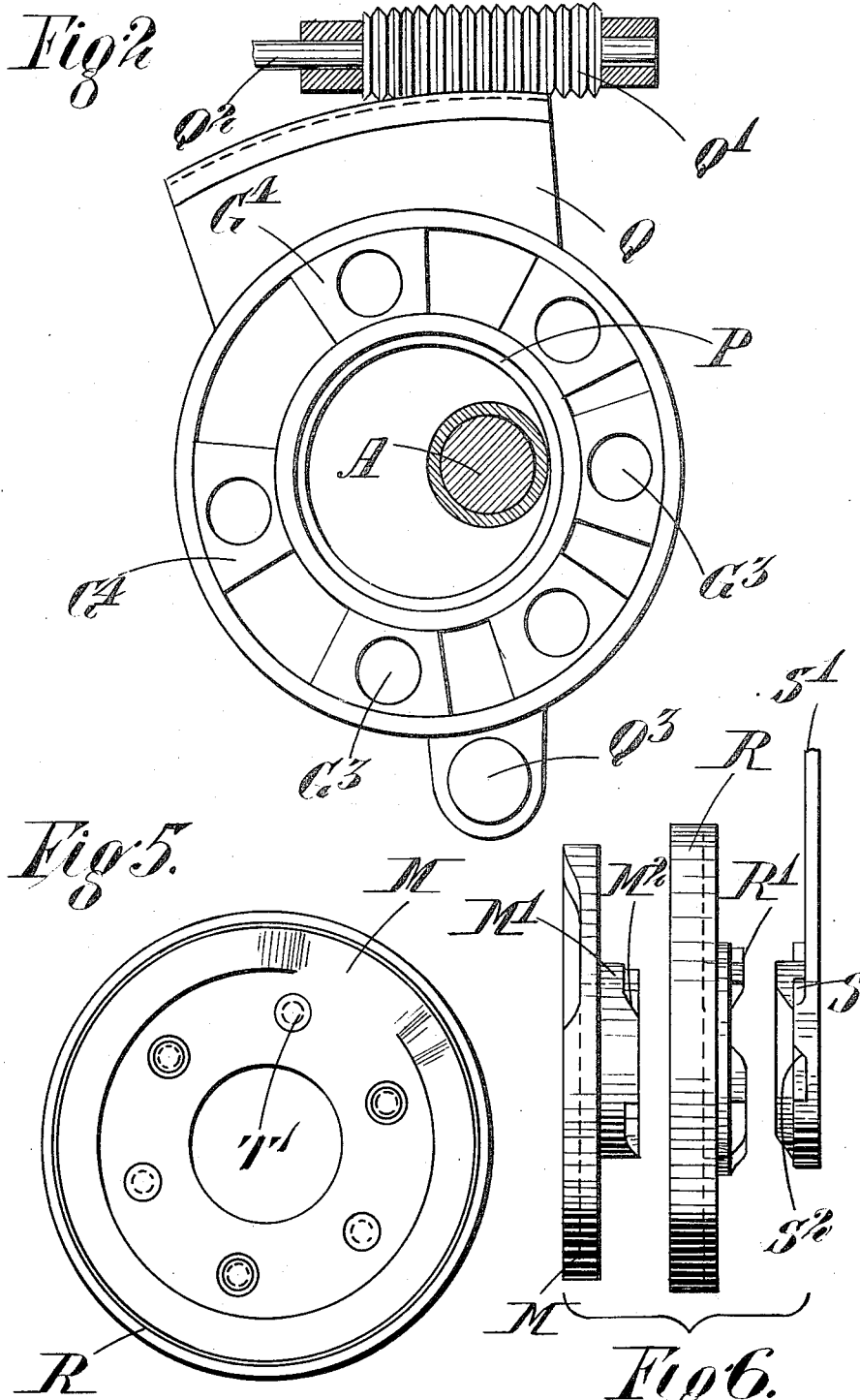

UNITED STATES PATENT OFFICE.

FREDERICK HENRY DE VEULLE, OF BIRMINGHAM, ENGLAND.

SPEED-GEAR.

No. 862,425.      Specification of Letters Patent.      Patented Aug. 6, 1907.

Application filed November 26, 1906. Serial No. 345,132.

*To all whom it may concern:*

Be it known that I, FREDERICK HENRY DE VEULLE, a subject of the King of Great Britain, residing at Birmingham, in the county of Warwick, England, consulting engineer, have invented certain Improvements in Speed-Gears, of which the following is a specification.

This invention relates to speed gears, and has for its object to provide a gradually variable gear, which is, if necessary, reversible.

In the accompanying drawings, which show one application of the invention in the form of a gear for relatively heavy work, such as for use on motor vehicles, or for driving machinery:—Figure 1 is a longitudinal section with parts in elevation, Fig. 2 is a cross-section on the line 2—2 in Fig. 1 taken in the direction of the arrows, Fig. 3 is a cross-section on the line 3—3 of Fig. 1 taken in the direction of the arrows, Fig. 4 is an end elevation on the line 4—4 in Fig. 1, Fig. 5 is a front view of the clutch operating cam, Fig. 6 is a view of the cam and cam-controlling mechanism slightly separated from one another, and with the cam controller shown in side and front elevations for the sake of clearness.

Like letters indicate like parts in all the figures.

The driving shaft A and the driven shaft B are arranged co-axially, and pass completely through the gear, the shafts being supported in bearings $C^1$ in a suitable casing C, which incloses the gear completely, though in the drawings it is broken away for the sake of clearness. To a flange $A^1$ on the driving shaft, is bolted the planet pinion carrier D, which is duplicated as at $D^1$, so as to support the planet pinions on both sides, the part $D^1$ having a bearing at $D^2$ on the driven shaft. The planet pinions E, of which in the construction shown there are six, though the number may vary in accordance with requirements, are mounted in this carrier. Generally speaking, the larger the number of planet pinions employed, the better is the effect obtained.

In the construction shown, owing to its compactness, it is impossible to employ six planet wheels of reasonable dimensions arranged in the same plane. Consequently these are staggered, as will be easily seen, but they all engage a common sun pinion F fixed to the driven shaft B. The planet pinions are mounted on spindles G which are free to oscillate in suitable bearings formed at each end in the planet pinion carrier D, $D^1$.

The planet pinions are not fixed to the spindles G but are mounted on clutches thereon, which may be of any suitable type. In the top part of Fig. 1 and in the cross-sectional drawing in Fig. 3, the clutches take the form of expanding rings H actuated by radial tapered plungers J, which, under the influence of rods K, having on each an incline $K^1$ are caused to expand and contract and so lock the planet pinions to the spindles G.

In the lower part of Fig. 1 the clutches are of the jaw type, as will be easily seen at $H^1$, one member $H^2$ being adapted to slide to engage the other member, this sliding being brought about by a rod K and cross pin $K^2$. The drawings show two types of clutches which may be employed, but obviously any other form may be used if preferable. The rods K are pushed to the left of Fig. 1 by a cam device about to be described, and are returned at the right time by springs L, one of which it provided for each rod.

The cam plate M is shown detached in Fig. 5 and Fig. 6, while it appears in section at the right hand end of Fig. 1. This is mounted on a key-way (not shown) on a bush $C^1$, and is fixed as regards rotation, but can slide longitudinally for a purpose afterwards described. Against the face of this cam plate bear the actuating tappets for the rods K. These take the form of sleeves N provided with rollers $N^1$ which engage the cam plate, and a detachable head $N^2$ of the common type, mounted in suitable bearings in a ring $N^3$. This ring $N^3$ is supported by suitable bolts $N^4$ from the planet pinion carrier $D^1$. To take up end thrust, thrust rings $N^5$ or a ball race may be employed.

The left hand end of each spindle G is formed with an arm $G^1$, carrying a crank pin $G^2$ which projects into a recess $G^3$ formed in a block $G^4$. These blocks $G^4$ lie in a recessed track O which is supported on ball bearings $O^1$ on an adjustable eccentric P. This eccentric P is screwed into a quadrant plate Q which has on its periphery worm teeth or the like engaging a worm $Q^1$ on an operating shaft $Q^2$. The quadrant plate can thus be rocked about its pivot $Q^3$ so as to throw the eccentric P into or out of center.

The center of the cam plate M is formed with a flange $M^1$ which is itself formed with a cam face $M^2$. On this flange $M^1$ is adapted to slide a flanged plate R, which, as will be seen in Figs. 1 and 6, overhangs the plate M, and at its center is formed with a cam face $R^1$. Free to rotate on the bearing bush $C^1$ is the cam controller S, which is provided with a lever extension $S^1$ enabling it to be easily operated, and which takes the form of a ring provided with a cam face $S^2$. The case C has screwed into it, as shown in Fig. 1, screws T having heads $T^1$ which form abutments for springs U, as will be easily seen. At the top part of Fig. 1 the spring shown abuts against the cam plate M, and the one in the lower part against the recessed plate R. The object of these springs is to force both the plates M and R towards the cam controller. The cams M², R¹ and S² are so formed that for one position of the lever S¹ the parts take up the position shown in Fig. 1, in which the cam plate M is in its operative position, while in another position, the plate R is forced towards the left so as to project beyond the face of the cam plate M, and so present a flat surface to the plungers N and hold the clutches H, H¹ out of engagement.

In a third position of the lever S¹ the plates M and R are free to move towards the right, free from the plungers N and to hold all the clutches H, H¹ in engagement under the influence of the springs L.

As will be seen, in one position of the lever S¹ a direct drive can be obtained while in another position the gear can be put out of action so that no power is transmitted through it.

The operation of the gear is as follows:—Assuming first the eccentric P to be concentric, and consequently no radial movement of the arms G¹ as they travel round the track O, and the cam-plate M to be in its operative position, rotation of the driving shaft A rotates the planet pinion carrier at the same angular velocity, and, the planet pinions E engaging the sun pinion F, rotate the sun pinion and the driven shaft at the same angular velocity. This is owing to the fact that at least one planet pinion at a time is unable to rotate on the pinion F, owing to its being locked to its spindle by its clutch H. In this way the direct drive is produced. In order to have no parts working when on the "direct drive", the cam M is withdrawn, so that all the clutches H are engaged and all the planet pinions locked solid. The withdrawal of the cam M is effected by the controller S, S¹ in the manner above described. This controller can be connected to the mechanism for shifting the eccentric P, so that the cam M cannot be withdrawn until the eccentric is central. Assuming the cam M now to be in its operative position and the eccentric to be moved to one side of the center, it will be seen that the ends of the arms G¹, in trailing over the eccentric, have a radial movement, which tends to swing the planet pinions through a small angle. The clutches H and the cam M cause the planet pinions to be locked during a portion of the forward rotation and free during the remaining portion and the backward rotation of the arms G¹. This forward rotation is imparted to the sun pinion F, and tends to reduce its speed of rotation, and rotate it at a lower angular velocity than the driving shaft A. This backward rotation of the planet pinions E can be increased until it equals its normal amount of rotation, when the sun pinion F will remain stationary and no power will be transmitted to it. To reverse the direction of rotation of the shaft B the eccentric is moved still further across. It will be seen that broadly what is obtained is that the planet pinions are rotated either above or below the normal velocities. By moving the eccentric P on the other side of the center the reverse action takes place, the sun pinion and driven shaft B being caused to rotate faster than the driving shaft A, according to the amount of eccentricity imparted to the eccentric.

In the construction in which six planet pinions E are used, each clutch is caused to engage one sixth of a revolution so that the drive is continuous. The point at which each clutch is in engagement is that at which the eccentric P imparts greatest movement to the arms G¹ or the correct speed of the engaging clutch H is obtained. If the eccentric P is on one side of its center during that sixth of a revolution it will give a reverse movement to the planet pinions. If on the other side it will impart a forward movement.

When the gear is in the zero position the flanged plate R may be forced up by the controller S S¹, and all the clutches are disengaged and no rotation can possibly be imparted to the driven shaft.

Preferably the cam M and clutches H are so arranged that just before one clutch H is disengaged the next clutch comes into engagement before any load is put upon it. This makes the operation of the gear and clutches easier, as will be seen.

Gears of a somewhat similar type to this have been constructed previously, but hitherto only overrunning or "free-wheel" clutches have been used. These are, in most cases quite useless for heavy loads.

By "positive" clutch is meant any type of clutch other than a "one-way" or over-running clutch.

What I do claim as my invention and desire to secure by Letters Patent is:—

1. In combination, an epicyclic train, a positive clutch intermittently engaging with one member thereof, and variable means for rotating said clutch above or below its normal velocity, substantially as described.

2. In combination, an epicyclic train, an eccentric, means for varying the throw of said eccentric, a positive clutch engaging one member of said train, and means connected to said positive clutch and engaging said eccentric for rotating said member above or below its normal velocity, substantially as described.

3. In combination, an epicyclic train, an eccentric, means for varying the throw of said eccentric, a positive clutch engaging one member of said train, and means connected to said positive clutch and engaging said eccentric for rotating said member above or below its normal velocity, and means for engaging all said clutches simultaneously, substantially as described.

4. In combination, an epicyclic train, an eccentric, means for varying the throw of said eccentric, a positive clutch engaging one member of said train, and means connected to said positive clutch and engaging said eccentric for rotating said member above or below its normal velocity, means for engaging all said clutches simultaneously, and means for freeing said train, substantially as described.

5. In combination, a driving shaft, a planet-pinion carrier fixed thereto, spindles mounted in said carrier, planet pinions free on said spindles, positive clutches for locking said pinions to said spindles, a driven shaft, a sun pinion thereon engaged by said planet pinions, variable means for rotating said spindles above or below the normal velocity of said planet pinions, and means for engaging and disengaging the positive clutches, substantially as described.

6. In combination, a driving shaft, a planet-pinion carrier fixed thereto, spindles mounted in said carrier, planet pinions free on said spindles, positive clutches for locking said pinions to said spindles, a stationary cam for actuating said clutches, push rods engaging said cam and said clutches, a driven shaft, a sun pinion thereon engaged by said planet pinions, and variable means for rotating said spindles above or below the normal velocity of said planet pinions, substantially as described.

7. In combination, a driving shaft, a planet-pinion carrier fixed thereto, spindles mounted in said carrier, planet pinions free on said spindles, positive clutches for locking said pinions to said spindles, a stationary cam for actuating said clutches, push rods engaging said cam and said clutches, means for actuating all said push rods simultaneously, means for freeing all said push rods simultaneously, a driven shaft, a sun pinion thereon engaged by said planet pinions, and variable means for rotating said spindles above or below the normal velocity of said planet pinions substantially as described.

8. In combination, a driving shaft, a planet-pinion carrier fixed thereto, spindles mounted in said carrier, planet pinions free on said spindles, positive clutches for locking said pinions to said spindles, a stationary cam for actuating said clutches, push rods engaging said cam and said clutches, a flanged plate adapted to engage said push rods, means for withdrawing said cam, a driven shaft, a sun pinion thereon engaged by said planet pinions, and variable means for rotating said spindles above or below the normal velocity of said planet pinions substantially as described.

In testimony whereof I have signed my name to this specification in the presence of two subscribing witnesses.

FREDERICK HENRY DE VEULLE.

Witnesses:
ARTHUR VILLIERS BLAKEMORE,
ERIC W. WALFORD.